US010580332B2

(12) United States Patent
French (10) Patent No.: US 10,580,332 B2
(45) Date of Patent: Mar. 3, 2020

(54) PRESSURE EQUALIZATION STRUCTURE AND MOTOR IMPROVEMENT FOR FLUID-IMMERSED SELF-ROTATING DISPLAYS

(71) Applicant: TurtleTech Design, Inc., Solana Beach, CA (US)

(72) Inventor: William W. French, Cardiff-By-The-Sea, CA (US)

(73) Assignee: TurtleTech Design, Inc., Solana Beach, CA (US)

(*) Notice: Subject to any disclaimer, the term of this patent is extended or adjusted under 35 U.S.C. 154(b) by 233 days.

(21) Appl. No.: 15/539,615

(22) PCT Filed: Dec. 24, 2015

(86) PCT No.: PCT/US2015/000453
§ 371 (c)(1),
(2) Date: Jun. 23, 2017

(87) PCT Pub. No.: WO2016/105561
PCT Pub. Date: Jun. 30, 2016

(65) Prior Publication Data
US 2019/0012942 A1    Jan. 10, 2019

Related U.S. Application Data

(60) Provisional application No. 62/152,714, filed on Apr. 24, 2015, provisional application No. 62/096,983, filed on Dec. 26, 2014.

(51) Int. Cl.
G09F 19/02    (2006.01)
A63H 29/22    (2006.01)
(Continued)

(52) U.S. Cl.
CPC ............ *G09F 19/02* (2013.01); *A63H 29/22* (2013.01); *G01C 17/38* (2013.01); *A63H 23/08* (2013.01); *G09F 11/235* (2013.01)

(58) Field of Classification Search
CPC ......... G09F 19/02; A63H 29/22; A63H 23/08; A63H 23/10; A63H 23/14
(Continued)

(56) References Cited

U.S. PATENT DOCUMENTS 2,192,148 A     2/1940  Otto, Jr.
3,010,224 A  *  11/1961 Roberts .................. G09F 11/23
                                                        352/85
(Continued)

OTHER PUBLICATIONS

USPTO, International Search Report, and Written Opinion of the International Search Authority in PCT/US15/00453, dated Jul. 12, 2016.

*Primary Examiner* — Gary C Hoge
(74) *Attorney, Agent, or Firm* — Charmasson, Buchaca & Leach, LLP (57) ABSTRACT

A self-rotating display device includes and outer light transmissive container (402) containing a light transmissive fluid (406) and an body (404) containing an electric motor (421) for rotating the body with respect to the outer container. The body also carries an amount of the fluid (430*a*) contacting the fluid in the outer container through a pressure equalizing gap (431) in the body which forms a fluid pathway between the inner cavity of the body and the inner chamber of the outer container. The fluid pathway forms self-regulating pressure relief structure which accommodates slight pressure variations in the fluid due to climactic conditions for example. A specialized reduced footprint fluid-immersible electric motor having separate field and compass magnets, which do not rotate relative to each other, helps eliminate (Continued)

magnetic cogging. The device can be manufactured according to a method which eliminates the necessity of a fill hole in the body.

9 Claims, 7 Drawing Sheets (51) Int. Cl.
    *G01C 17/38*     (2006.01)
    *A63H 23/08*     (2006.01)
    *G09F 11/235*     (2006.01)

(58) Field of Classification Search
    USPC .......................................................... 40/406
    See application file for complete search history.

(56) References Cited

U.S. PATENT DOCUMENTS

| | | | |
|---|---|---|---|
| 3,128,562 A | | 4/1964 | Yusa |
| 3,695,607 A | * | 10/1972 | Stouffer ................. A63H 23/08 40/409 |
| 3,962,902 A | | 6/1976 | Auqalina et al. |
| 4,268,989 A | * | 5/1981 | Wickham ............... A63H 23/10 446/153 |
| 4,448,409 A | | 5/1984 | Kaga et al. |
| 4,582,498 A | * | 4/1986 | Tamada ................. B65D 23/14 446/160 |
| 6,853,283 B1 | * | 2/2005 | French .................. F16C 39/063 335/296 |
| 10,092,850 B1 | * | 10/2018 | Smoot .................... A63H 29/22 |
| 2002/0020089 A1 | * | 2/2002 | Yuen ...................... G09F 19/02 40/406 |
| 2002/0152654 A1 | * | 10/2002 | Liao ........................ G09F 19/02 40/406 |
| 2005/0102869 A1 | | 5/2005 | French |
| 2008/0025026 A1 | * | 1/2008 | Lee ....................... F21S 10/002 362/253 |
| 2016/0074768 A1 | * | 3/2016 | Tsai ....................... A63H 33/22 446/236 |

* cited by examiner

PRESSURE EQUALIZATION STRUCTURE AND MOTOR IMPROVEMENT FOR FLUID-IMMERSED SELF-ROTATING DISPLAYS

PRIOR APPLICATION

The invention claims the benefit of U.S. Provisional Patent Application Ser. No. 62/096,983 filed 2014 Dec. 26 and U.S. Provisional Patent Application Ser. No. 62/152,714 filed 2015 Apr. 24 incorporated herein by reference.

FIELD OF THE INVENTION

The invention relates to self-powered display devices, and more particularly, to enclosed, fluid immersed, light-powered, electric motor driven self-rotating devices.

BACKGROUND

Self-moving displays are often used as toys, decorative conversation pieces or advertising media. Such devices are disclosed in my U.S. Pat. Nos. 6,275,127; 6,853,283; 6,937,125; and U.S. Pat. Publication No. 2005/0102869; all of which are incorporated herein by reference.

These devices can have a sealed outer container having light transmissive walls containing a light transmissive liquid which buoyantly supports an inner body which appears to magically rotate on its own with respect to the outer container, or in what appears to be a solid block of clear glass or plastic. The rotation can be driven by an electric motor hidden within the body. The motor can be powered by a battery or in a longer-term manner by light radiation impacting on photovoltaic cells hidden within the body.

One problem can occur due to atmospheric pressure and humidity differences occurring naturally at various localities throughout the world over time. For example, during a winter storm in Denver, Colo. the pressure and humidity may be far less than during the summer in Rio De Janeiro. Due primarily to manufacturing and safety concerns, the outer container of the device is often made of a relatively non-hermetic material such clear acrylonitrile butadiene styrene (ABS). Therefore, changes in atmospheric pressure and humidity can seep through the walls of the outer container and change the water content and vapor pressure of the inner light transmissive liquid. These changes, coupled with changes in temperature can cause the total liquid volume inside the container to become bigger or smaller than the volume available for the fluid. If the liquid volume is bigger, it can cause an overpressure potentially damaging the display, potentially ruining the magical appearance of the device. These changes can also lead to changes in the buoyancy of the inner body when it contains an amount of gas due to a Cartesian diver effect.

Figure 1:
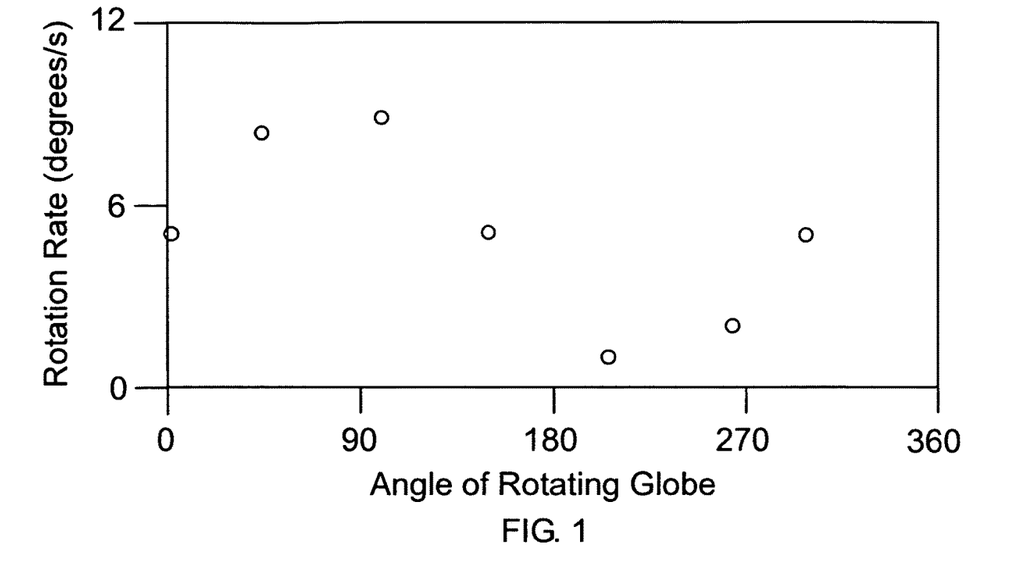
FIG. 1 is a graph shows how the speed of rotation can vary with rotation angle in prior art devices.

Another potential problem is that these devices can rely on an internal compass magnet aligned with an ambient magnetic field such as the earth's magnetic field to act as a source of counter-torque for their internal motors. In such devices there has been a possibility of a magnetic interaction between the compass magnet and field magnets that are used to generate a relative torque as they interact with coils of wire carrying currents of the on-board electric motor. FIG. 1 shows graphically how this magnetic interaction can cause a speed variation in the motor. It is clear that as the driving current to the motor is reduced, the motor will stop at a much lower drive current than it would without this interaction negatively impacting operation in low-light conditions.

This problem can be reduced by designing the field magnet structure to minimize the magnetic interaction and also by mounting the compass magnet far from the field magnets. However, practically speaking, this reduction can be expensive and can detrimentally increase the size of the powering mechanism in a device having limited space.

Therefore there is a need for a self-rotating device which addresses some or all of the above identified inadequacies.

SUMMARY

The principal and secondary objects of the invention are to provide an improved fluid suspended, self-rotating device. These and other objects are achieved by a pressure equalizing fluid pathway through the wall of a fluid suspended, self-rotating body.

In some embodiments there is provided a specialized electric motor having separate compass and field magnets that do not rotate with respect to one another.

In some embodiments the self rotating body is bouyantly supported within the container by two different density immiscible fluids.

In some embodiments, there is provided a self-rotating device which comprises: an outer container having an internal cavity shaped and dimensioned to contain an amount of a first fluid and a self-powered hollow rotating body immersed in said first fluid; wherein said body comprises: an outer wall; an upper chamber; a lower chamber; a fluid impermeable, light transmissive bulkhead separating said upper and lower chambers; a conduit passing through said outer wall and defining an inner passageway in fluid communication between said cavity and said upper chamber; and, and, a second amount of said fluid located in said upper chamber, and and amount of air in said upper chamber.

In some embodiments said fluid comprises two different density liquids, wherein said liquids are selected to buoyantly support said body within said outer container.

In some embodiments said fluid consists of a single homogeneous liquid and wherein said device comprises a mechanical support rotatively suspending said body in said fluid.

In some embodiments, there is provided a rotating container which comprises: a container housing; an electric motor comprising: a compass magnetic for aligning to an ambient magnetic field; at least one field magnet apart from said compass magnet; a mechanical linkage fixing an orientation of said field magnet to an orientation of said compass magnet; at least one coil mechanically fixed to said container; wherein said at least one coil is located to interact with a magnetic field generated by said at least one field magnet; and, a current supply for supplying commutated current to said at least one coil.

In some embodiments, there is provided a self-rotating device comprises: a light transmissive outer container having an internal cavity shaped and dimensioned to contain an amount of a fluid and a self-powered hollow rotating body immersed in said fluid; wherein said outer container is sealed; wherein said body comprises: an outer wall substantially impermeable to said fluid; an inner chamber; at least one conduit passing through said outer wall and defining a fluid passageway in fluid communication between said cavity and said inner chamber; and, a portion of said fluid located in said inner chamber, and an amount of a gas in said inner chamber.

In some embodiments, said amount of fluid comprises a lower density component fluid and a higher density component fluid, wherein said lower density component fluid is substantially immiscible with said higher density component fluid.

In some embodiments each of said component fluids are denser than air.

In some embodiments said amount of fluid comprises a first lower density liquid and a second higher density liquid, wherein said first liquid is substantially immiscible with said second liquid.

In some embodiments said conduit has a first aperture through said outer surface of said body located above an interface between said first and second liquids, when said device is at equilibrium in a gravity field.

In some embodiments said conduit has a first aperture through said outer surface of said body located above an interface between said first and second liquids, when said device is at equilibrium in a gravity field.

In some embodiments said body further comprises a top shell and a bottom shell joined along a seam by a bond.

In some embodiments said conduit comprises a gap between said top shell and said bottom shell along said seam.

In some embodiments said gap is formed by an absence of said bond.

In some embodiments said body is substantially spherical and wherein said cooperative mating surfaces occur at an equator.

In some embodiments said conduit remains permanently immersed in liquid.

In some embodiments, there is provided a self-rotating device comprises: an outer container having an internal cavity shaped and dimensioned to contain an amount of a first fluid and a self-powered hollow rotating body immersed in said first fluid; wherein said body comprises: an outer wall; an upper chamber; a lower chamber; a fluid impermeable, light transmissive bulkhead separating said upper and lower chambers; at least one conduit passing through said outer wall and defining an inner passageway in fluid communication between said cavity and said upper chamber; and, a second amount of said fluid located in said upper chamber, and an amount of air in said upper chamber.

In some embodiments said fluid comprises two different density liquids, wherein said liquids are selected to buoyantly support said body within said outer container.

In some embodiments said fluid consists of a single homogeneous liquid and wherein said device comprises a mechanical support rotatively suspending said body in said fluid.

In some embodiments, there is provided a rotating body comprises: a body housing; an electric motor comprising: a compass magnetic for aligning to an ambient magnetic field; at least one field magnet apart from said compass magnet; a mechanical linkage fixing an orientation of said field magnet to an orientation of said compass magnet; at least one coil mechanically fixed to said body; wherein said at least one coil is located to interact with a magnetic field generated by said at least one field magnet; and, a current supply for supplying commutated current to said at least one coil.

In some embodiments, there is provided a method for manufacturing a self-rotating device comprises: selecting a bondable pair of upper and lower shells in an unjoined state; wherein said lower shell contains a motor component; wherein said lower shell has an smaller unfilled volume than said upper shell; inverting said upper shell; filling said upper shell with a first amount of a liquid; bonding said lower shell to said upper shell while in the inverted state to form a joined body; reverting said joined body to its upright orientation; and, placing said joined body into a container including a second amount of said liquid.

The original text of the original claims is incorporated herein by reference as describing features in some embodiments.

DESCRIPTION OF THE EXEMPLARY EMBODIMENTS

Figure 2:
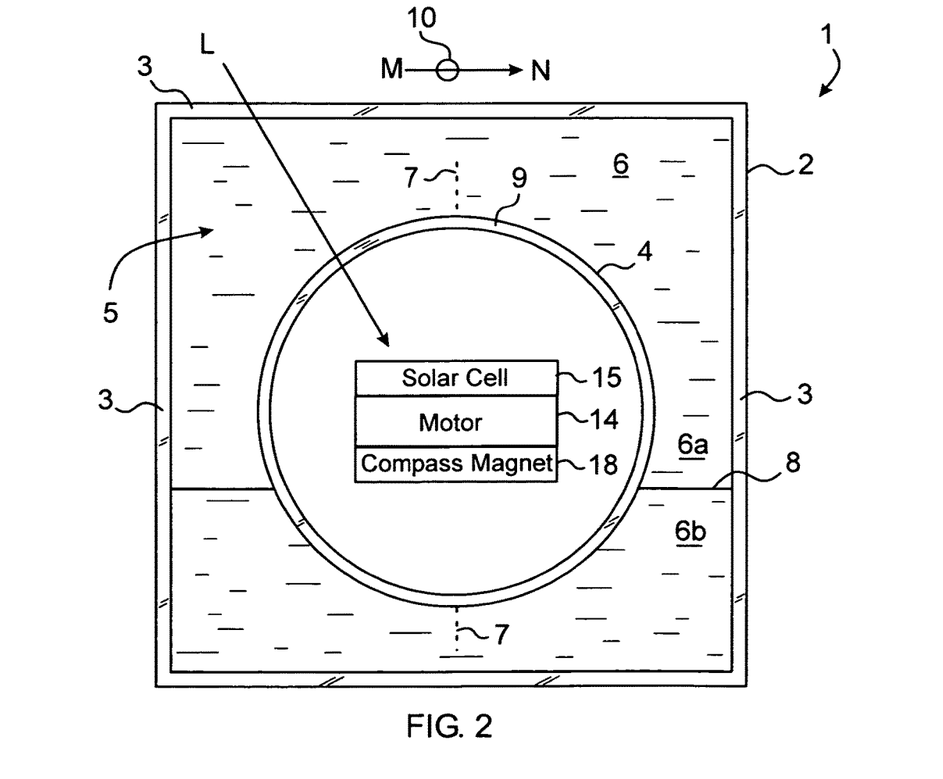
FIG. 2 is a diagrammatic cross-sectional side view representation of a light driven, motor containing, rotating body immersed in a light transmissive fluid contained in a light transmissive outer container.

Referring now to the drawing there is shown in FIG. 2 a self-rotating device 1 having a substantially stationary, sealed outer container 2 having light transmissive walls 3 surrounding an inner cavity 5 containing an amount of light transmissive fluid 6, and an axially symmetrically shaped body 4 such as a sphere or ball is immersed in the fluid and allowed to rotate about an axis 7 with respect to the outer container. The body has a light-transmissive wall 9 allowing ambient light rays L to pass through the outer container wall 3, fluid 6, and body wall 9 to provide power to a solar cell 15 supplying current to an electric motor 14 inside the body. The axially symmetric shape of the body allows it to rotate with a minimum amount of drag from contacting the surrounding liquids. The earth's magnetic field 10 provides an anchor to a compass magnet 18 within the body providing a source of counter-torque to the motor. The fluid can comprise two immiscible liquids, a less dense liquid 6a, and a more dense liquid 6b, separated at an interface 8 as disclosed in French, U.S. Pat. Publication No. 2005/0102869 incorporated herein by reference.

Figure 3:
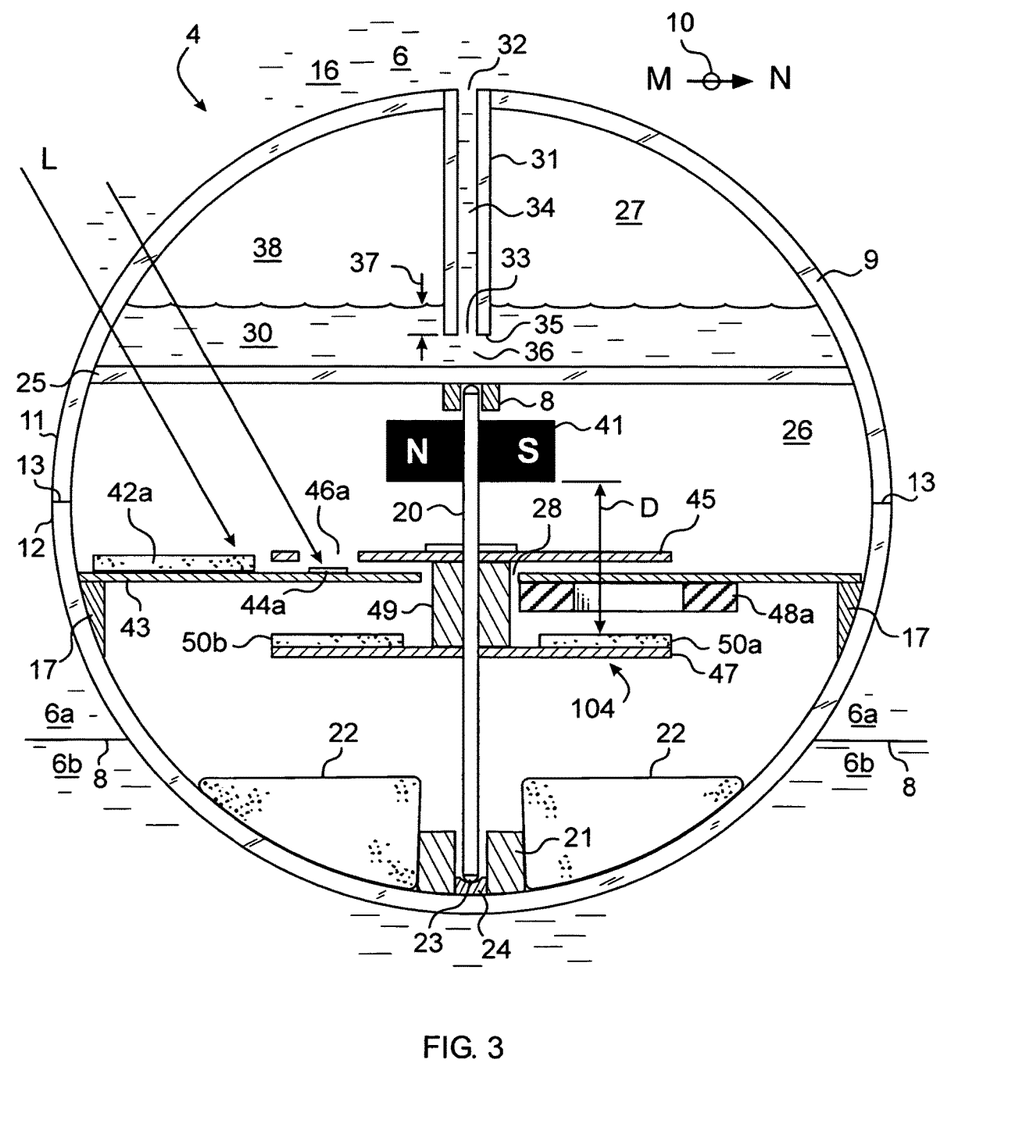
FIG. 3 is a diagrammatic cross-sectional side view representation of a motor-containing body showing the drive construction and the pressure relieving upper chamber according to an exemplary embodiment of the invention.

As shown in FIG. 3 the body 4 in this embodiment can include a substantially hemispherical top shell 11 and a substantially hemispherical bottom shell 12 joined at an equatorial seam 13 to form a self-rotating, substantially spherical ball.

The body 4 can have a pressure relief structure which helps equalize pressures inside and outside the body. The body 4 includes an internal upper chamber 27 and an internal lower chamber 26 separated by an internal light transmissive disk-shaped septum 25. The lower chamber can be empty or filled with one or more fluids such as air, inert liquids or both. A conduit 31 can be formed penetrating the body wall from an outer aperture 32 exposed to the outer container cavity 16, to an inner aperture 33 exposed to the body's upper chamber 27. The conduit thus defines a fluid passageway 34 extending between the cavity 16 and the upper chamber 27. The passageway is in fluid communication between the liquid 6a in the container cavity 16 and a portion of liquid 30 contained within the body's upper chamber.

The inner end 35 of the conduit 31 surrounding the inner aperture 33 terminates a distance or gap 36 above the septum 25. The volume of the portion of liquid 30 in the inner chamber 27 is selected to create a depth 37 above the level of the inner aperture and leave a volume of less dense fluid such as air 38 located in the upper region of the inner chamber when the device is at equilibrium in a gravity field. Further, the volume should be sufficient to provide for a significant depth 37 to keep the inner aperture 33 immersed during incidental movement such as shaking or tilting during transport. This arrangement allows for liquid within the conduit 31 to flow into and out of the conduit based on the respective pressures of the liquids 6a,6b in the inner cavity 16 and the inner chamber 27. The volume of air 38, as a gas, is compressible and can thus act to dampen the forces of differential pressures.

Those skilled in the art will readily appreciate the maximization of parameters such temperatures and pressures which would tend to drive down the level of the portion of liquid 30 within the body. Care should therefore be taken to select a depth during nominal conditions which prevents the level from lowering to an extent which exposes the inner aperture.

The conduit 31 is preferably made relatively narrow, having a cross-sectional area of between about 1.0 and 3.0 square millimeters to help prevent bubbles from passing through the conduit when the body 4 is temporarily inverted or tilted during transport or other movement. The body 4 is normally in the orientation shown in FIG. 3 due to a ring shaped ballast weight 22 near the lower part of the body. Usually the pressure differential between the upper chamber 27 and the outer container cavity 16 occurs very gradually. Thus a conduit having a smaller cross-sectional area is often adequate. Indeed, a conduit formed by what may be termed a leak is often adequate to allow pressure equalization. Further, by selecting a narrower conduit, surface tension forces can temporarily prevent liquid remaining in the conduit from escaping the conduit when the inner aperture 33 is briefly exposed to air. This can help prevent the passage of air through the conduit during occasional temporary disruption of the orientation of the body when the device is temporarily tilted. Air passage through the conduit would lead to unsightly bubbles in the liquid in the container cavity 16 outside the body 4.

When two immiscible liquids 6a,6b are used to form the amount of fluid 6, the greater density liquid 6b can be a humectant whereas the lesser density liquid 6a can be selected to have a matching index of refraction to the humectant as described in French supra. Many humectants such as propylene glycol can be damaging to the internal drive components of a motorized device. Therefore, in such situations where the internal drive mechanisms such as the motor and solar cells are exposed to the fluid, it is preferred that the lesser density liquid 6a be the liquid that exclusively enters and exits the inner chamber 27. Thus it is preferable to locate the conduit 31 outer aperture 32 above the interface 8 between the two liquids when the device is at equilibrium.

Figure 4:
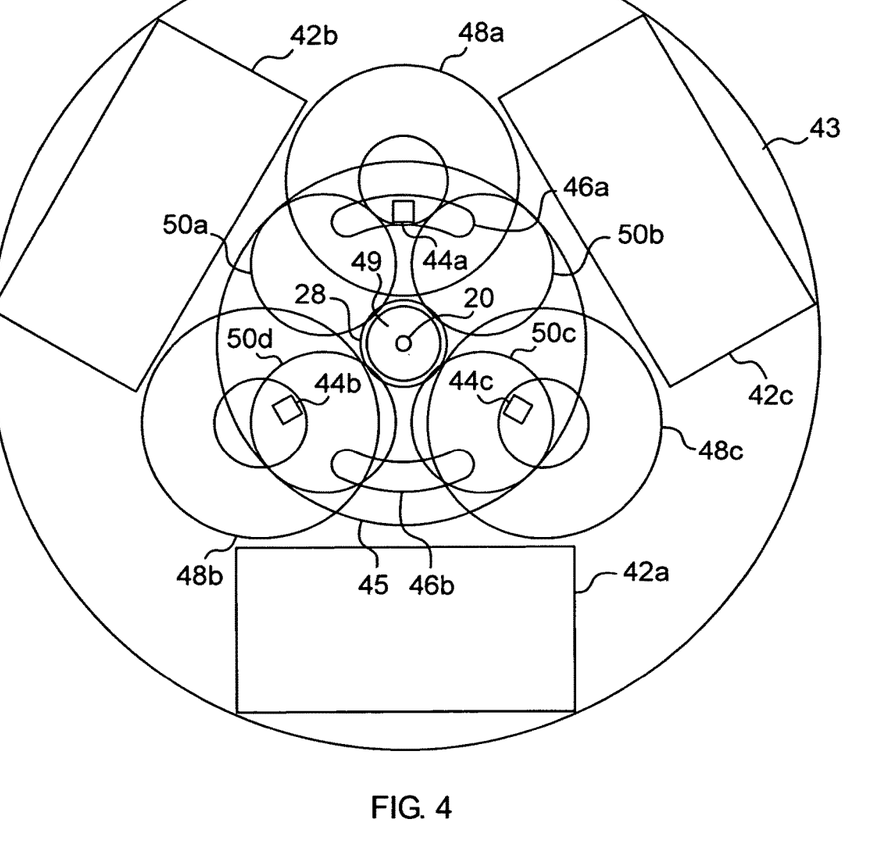
FIG. 4 is a diagrammatic top partial transparent view of the body of FIG. 3.

Referring now to FIGS. 3 and 4 the device further includes a vertical shaft 20 connected to a compass magnet 41, and an upper iron disk 45 and a lower iron disk 47 spaced apart a fixed distance by a spacer 49 and perpendicular to the shaft. The shaft 20 is rotatively supported on the bottom by a hard rounded end 23 resting in a cup jewel bearing 24. A cup bearing holder 21 retains the cup jewel bearing and also locates and retains the ballast ring 22. A solar cell 42a is shown mounted on a printed circuit board 43. Brackets 17 mount the printed circuit board to the bottom hemispherical shell 12.

FIG. 4 shows a top view of the structure of FIG. 3, with its major parts shown in transparency for clarity. It shall be noted that the angular orientation of the rotating parts of the motor are different between FIGS. 3 and 4. Three uniformly angularly spaced apart solar cells, 42a,42b,42c are shown mounted on the top of the printed circuit board 43 and three uniformly angularly spaced apart bobbins wound with wire 48a,48b,48c are shown mounted on the bottom of the printed circuit board. Four uniformly angularly spaced apart disk shaped magnets 50a,50b,50c,50d are also shown mounted on the lower iron disk 47, two of which, 50a and 20b are shown in FIG. 3. The spacer 49 passes through a hole 28 in the printed circuit board and the shaft 20 is in the center of the spacer 49.

As the printed circuit board 43 rotates with respect to the iron disks 45,47, each phototransistor 44a,44b,44c is shaded by the upper iron disk 45 until it passes under one of the apertures 46a,46b. In FIG. 4, the phototransistor 44a is shown passing under aperture 46a, and phototransistors 44b and 44c are shaded by the top iron disk 45. While under the aperture, phototransistor 44a is exposed to light and delivers current to its bobbin 48a.

Figure 5:
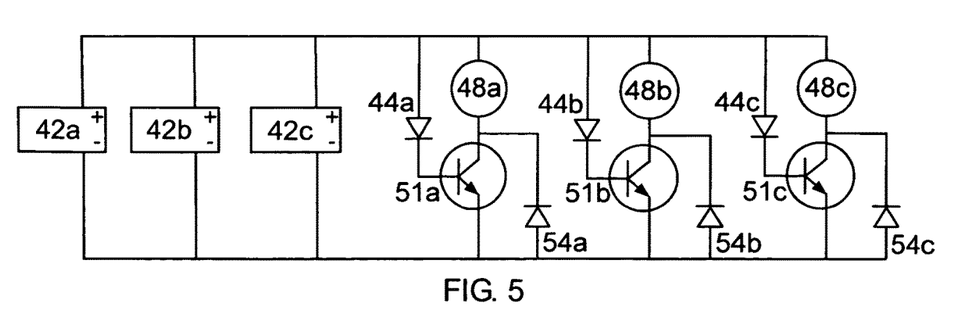
FIG. 5 an electrical circuit diagram for the electrical components of the body of FIG. 2.

FIG. 5 shows the electronic circuit on the printed circuit board 43. Light falling on any of the phototransistors 44a, 44b,44c will create a current that is amplified by its respective transistor 51a,51b,51c to drive current through coil its respective coil 48a,48b,48c. Diodes 54a, 54b,54c protect the transistors in case any reverse voltage is generated if the relative rotation of the coils 48a,48b,48c and magnets 50a, 50b,50c,50d is somehow forced to happen in reverse. Solar cells 42a,42b,42c provide voltage to drive the circuit.

In the relative orientation of the printed circuit board 43 to the iron disks 45,47 shown in FIG. 3, the coil 48a will be receiving current because phototransistor 44a is illuminated and this current will create a relative torque between the coil 48a and the magnets 50a and 50b. The shaft 20 is held from rotating by the interaction of the compass magnet 41 with an ambient horizontal magnetic field 10 such as the earth's magnetic field. The net result will be that the coil 48a, the printed circuit board 43 and the body 4 will feel a torque and start to rotate if the body is in a low friction environment such as described above. Continued rotation will eventually cause phototransistor 44a to be shaded and expose another phototransistor 44b or 44c to be exposed through aperture 46b and this will cause continued rotation.

It is important to note that since there is no relative rotation between the magnets 50a,50b,50c,50d and the compass magnet 41, then there will be no magnetic drag. This means the distance D between the compass magnet and the field magnets can be much smaller than in prior motors of this type, thereby allowing room for other structures such as the pressure equalization structure described above. This is advantageous because any changes in the relative internal volume of the outer container 2 and the total volume of the inner cavity 16, including the body 4, and the liquids 6a and 6b, will not result in excessive pressures and possible bursting of the outer container 2, because excess pressure will cause liquid 6a to flow into the upper chamber 27 and slightly compress the air 38 above the portion of fluid 30 in the chamber.

The dimensioning of all the above components can be easily determined knowing the coefficients of expansion, dimensions, and environmental extremes expected. Net expansion of the outer container and its contents can be caused by temperature changes and by water vapor passing through the material of outer container 2 such as plastic, as might be caused in a very humid environment.

Figure 6:
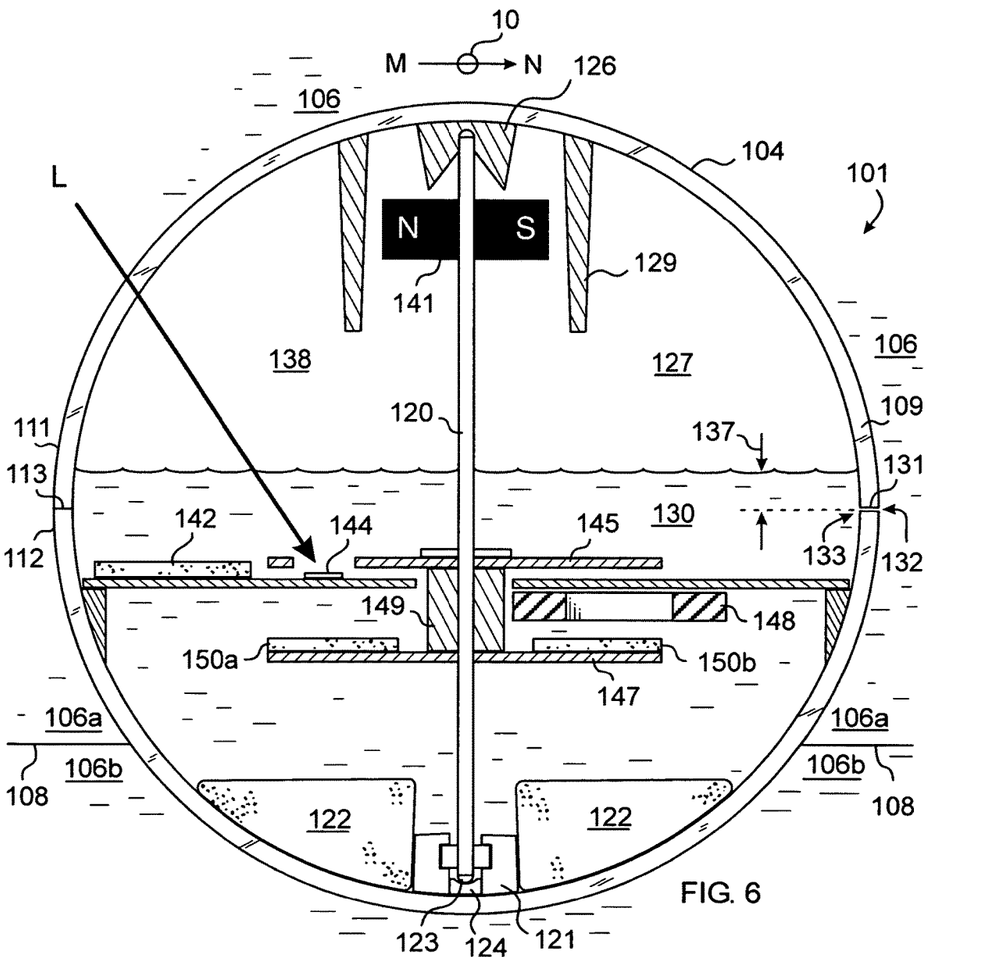
FIG. 6 is a diagrammatic cross-sectional side view representation of a motor-containing body showing the drive construction and the pressure relieving upper chamber according to an alternate exemplary embodiment of the invention.
Figure 7:
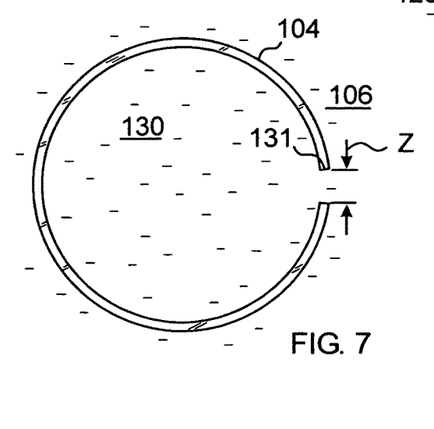
FIG. 7 is a diagrammatic cross-sectional top view of the body of FIG. 6 showing the pressure relieving conduit through the body wall.

Referring now to FIGS. 6 and 7, there is shown an alternate embodiment of a pressure relief structure implemented on a fluid immersed, self-rotating display device 101. In this embodiment the pressure equalizing conduit 131 can be efficiently formed by creating a gap between the two joined shells 111,112.

The device 101 includes an inner body 104 buoyantly suspended in a fluid 106 contained within the internal cavity 116 of a translucent, sealed outer container, not shown, but similar to the container 2 shown in FIG. 2. The fluid can include a first amount of lesser density liquid 106a such as a paraffinic liquid located within the upper part of the cavity and a second greater density liquid 106b such as a humectant liquid, within the lower part of the cavity. The liquids 106a, 106b can be immiscible, meeting along an interface 108, preferably made to have the same index of refraction, and be adjusted in density and volume to cause the body 104 to float buoyantly near the center, vertically, of the outer container.

The body 104 includes a top substantially hemispherical shell 111 and a bottom substantially hemispherical shell 112 bonded along a seam 113 to form a sphere or ball. This shape of the body is angularly symmetric so that in can rotate with a minimum amount of drag from contacting the surrounding liquids 106a,106b. The body has an internal chamber 127. A conduit 131 penetrates the body wall 109 from an outer aperture 132 exposed to the suspending fluid 106 to an inner aperture 133 exposed to the inner chamber 127. The conduit thus defines a fluid passageway extending between the suspending fluid and the inner chamber. Thus, the passageway is in fluid communication between the suspending liquids 106a,106b and a portion of liquid 130 contained within the inner chamber.

The amount of liquid 130 in the inner chamber 127 is selected to create a depth 137 above the level of the inner aperture 133 and leave a volume of lesser density fluid such as air 138 located in the upper portion of the inner chamber. This arrangement allows for liquid within the conduit to flow into and out of the conduit based on the respective pressures of the suspending liquids 106a,106b and the amount of liquid 130 in the inner chamber 127.

The conduit 131 is dimensioned to be relatively narrow, to help prevent bubbles from passing through when the body 104 is temporarily inverted due to shaking. The conduit can be formed by an absence of adhesive used to join the two shells together along their mutual seam 113. An angular zone Z along the seam of between about 5 and 20 degrees is selected for the absence of adhesive. For a body having an outer diameter of about 100 millimeters, an angular zone of about 10 degrees forms a conduit about 25 millimeters wide and about 0.001 inch thick between the shells.

The body 104 is normally in the orientation shown because there is a ring-shaped ballast weight 122 near its lower part. The amount of liquid 130 in the inner chamber 127 can also provide ballast and damping to the other components contained within the inner chamber and immersed within the liquid.

FIG. 6 further shows alternately configured drive components for a light energized electric motor powered device. These components operate similarly to those described in the previous embodiment. A vertical shaft 120 is connected to a compass magnet 141, a top iron disk 145, a spacer 149, and a bottom iron disk 147 upon which is mounted four uniformly angularly spaced apart disk magnets, two of which, 150a and 150b are shown in FIG. 6. The shaft 120 is supported on the bottom by a hard rounded ball end 123 resting in a cup jewel bearing 124. A cup bearing holder 121 retains the cup jewel bearing and also locates and retains the ballast ring 122. A top bearing 126 rotatively engages the top of the shaft. A protective cup structure 129 protects the compass magnet from sloshing liquid in the event the body is overturned during transport. As with the previous embodiment light L falling on an unshaded phototransistor 144 will allow current to flow from the solar cells 142 through the appropriate coil 148 to generate a magnetic field which forces it away from disk magnet 150b.

Figure 8:
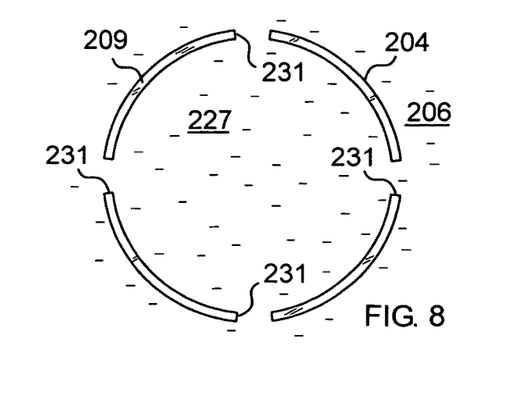
FIG. 8 is a diagrammatic cross-sectional top view of a body having a plurality of pressure relieving conduits through the body wall.
Figure 9:
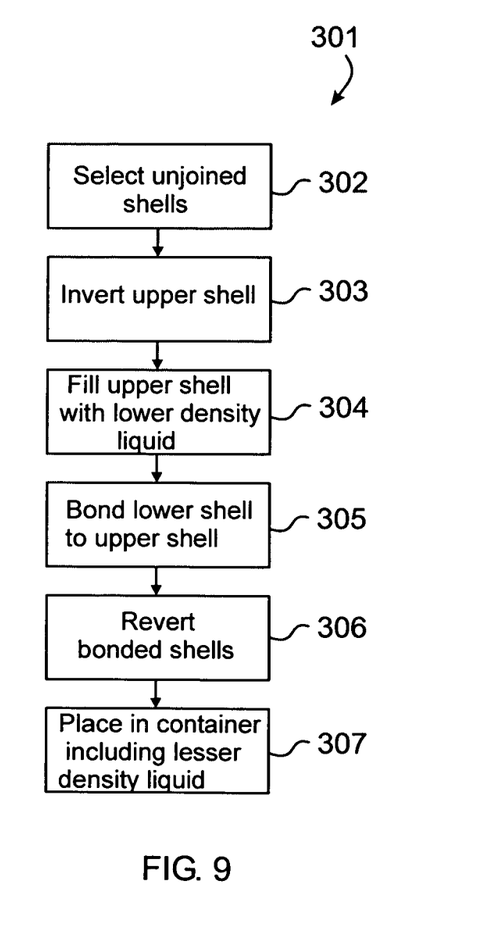
FIG. 9 is a flow chart diagram showing the primary steps of manufacturing a fluid containing body.

Referring now to FIG. 8, there is shown an alternate embodiment of a hollow rotating body 204 having a plurality of conduits 231 passing through the body wall 209 allowing fluid communication between an inner chamber 227 and the fluid 206 outside the body. Thus, in the event one of the conduits becomes blocked or failed to form adequately during manufacture, the other conduits provide redundancy.

Referring now to FIGS. 9-12 there is shown a manufacturing method 301 for assembling a self-rotating, fluid-immersed display device. In general the method involves the steps of: selecting the upper and lower shells of the rotating body in an unjoined state 302 where the lower shell contains the primary motor components so that it has an smaller unfilled volume than the upper shell; inverting the upper shell 303; filling the upper shell with an amount of lesser density liquid 304; bonding the lower shell to the upper shell while in the inverted state 305 to form the joined body; reverting the joined body to its upright orientation 306; and placing the joined body into a container including lesser density liquid 307.

Figure 10:
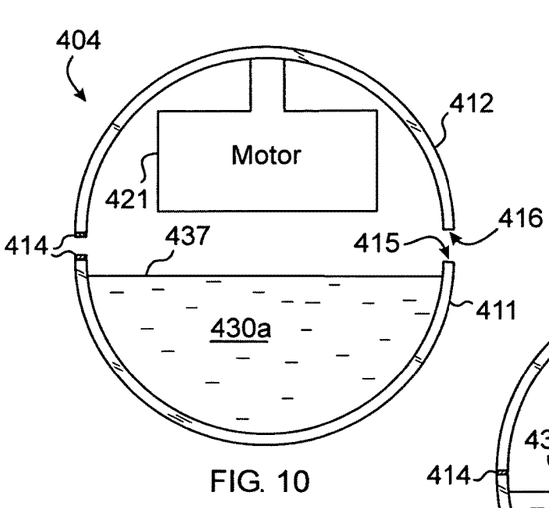
FIG. 10 is a diagrammatic cross-sectional side view representation of the inverted, unjoined shells in the manufacturing process of FIG. 9.

FIG. 10 shows the upper shell 411 and the lower shell 412 of the substantially spherical body 404 in an unjoined state. The upper shell 411 can be inverted and a volume of lower density liquid 430a poured in. The level 437 of the liquid need not rise above the rim which is the exposed ring-shaped surface of the upper shell. Layers of adhesive 414 can be deposited along the exposed, ring-shaped surfaces of one or both of the shells 411,412 intended to contact one another. An absence of adhesive is left along a corresponding angular zones 415,416 of both shells.

Figure 11:
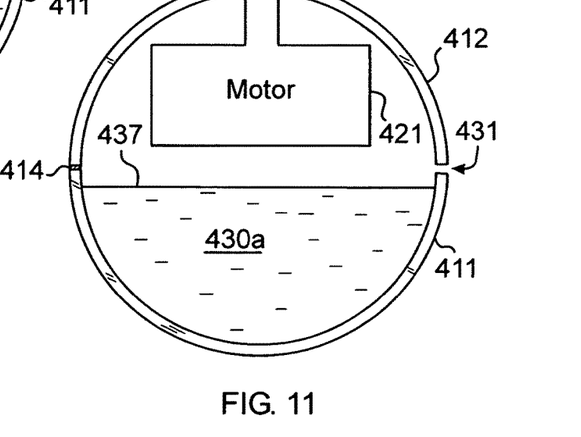
FIG. 11 is a diagrammatic cross-sectional side view representation of the inverted joined shells in the manufacturing process of FIG. 9.

Next, as shown in FIG. 11, while the adhesive 414 remains uncured, the lower shell 412 containing the motor components 421 attached thereto, also in an inverted orientation, can be mated to the liquid filled, inverted upper shell 411. Care must be taken to properly align the two angular zones where adhesive is missing. The adhesive is allowed to cure. Where there is an absence of adhesive between the two shells along the mated angular zones, a gap 431 is formed which will act as the fluid conduit described above.

Figure 12:
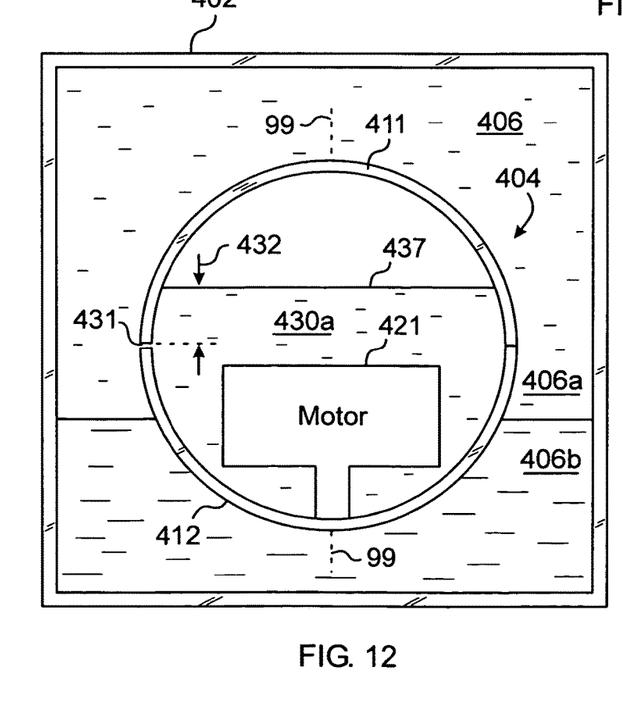
FIG. 12 is a diagrammatic cross-sectional side view representation of the reverted joined shells immersed in fluid in a contain in the manufacturing process of FIG. 9.

As shown in FIG. 12, the spherical body 404 in its joined hemispheres state can be reverted to its upright orientation where the upper shell 411 is on top of the lower shell 412. The volume of the liquid 430*a* poured into the inverted upper shell 411 is selected so that when the joined body is returned to its non-inverted state the liquid level 437 will rise to a predetermined level which is a distance 432 above the level of the conduit 431. This rise in level corresponds to the volume of the motor components 421 attached to the lower shell which become immersed in the liquid. The body can then be buoyantly supported by an amount of fluid 406 including a greater density liquid 406*b* and a lesser density liquid 406*a* as in a prior embodiment to rotate about its vertical axis 99.

In this method the pouring of the liquid into the upper shell can be accomplished much more rapidly than injecting the same volume of liquid through a hole in the joined shells. Further, the necessity of an unsightly fill-hole is eliminated.

An advantage of the present embodiment is that use of such a low profile motor can benefit in the design of a ball-in-cube type structure by allowing space within the ball to house the pressure relief structure.

Figure 13:
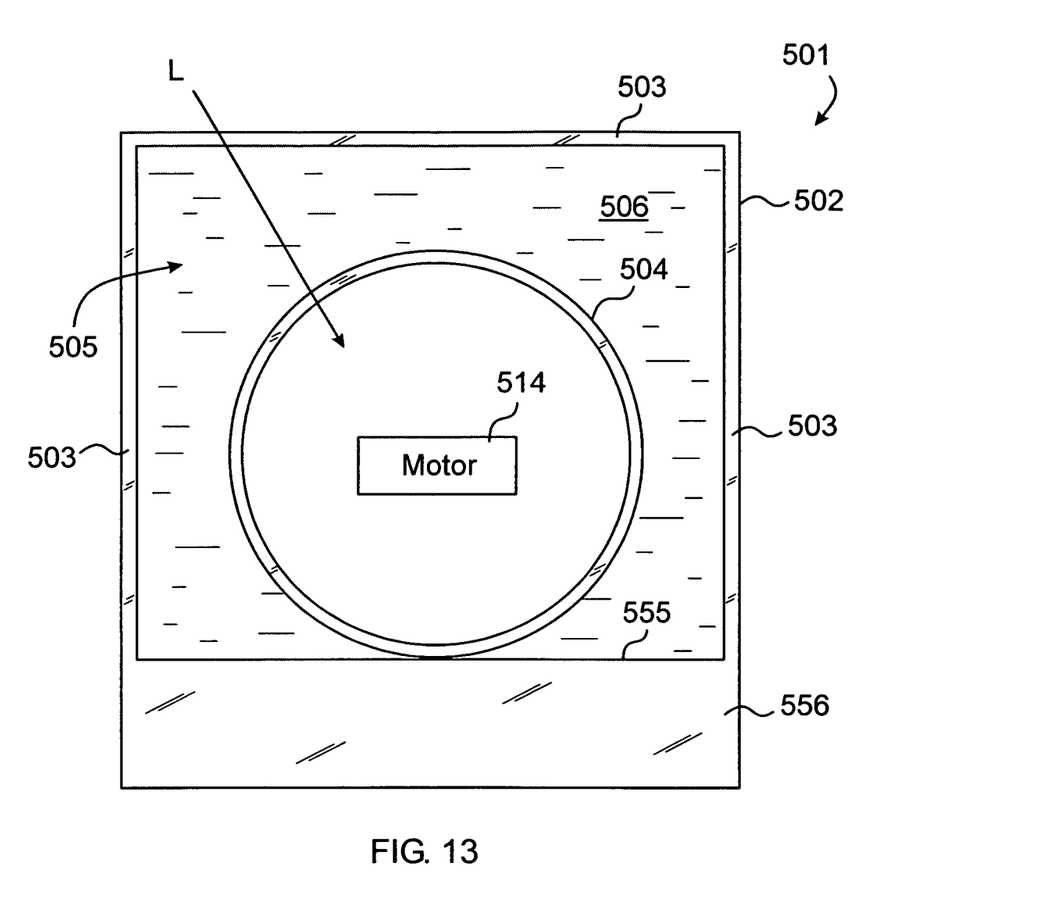
FIG. 13 is a diagrammatic cross-sectional side view representation of a light driven, motor containing, rotating body immersed in a single homogeneous light-transmissive fluid contained in a light-transmissive outer container.

As shown in FIG. 13, a self-rotating display device 501 can include a rotating body 504 having and internal light driven motor 514 one of the pressure relief structures shown in the prior embodiments, which is immersed in a fluid consisting of a single homogeneous liquid 506 contained within a sealed container 502 having light-transmissive walls 503. The body may rest against the bottom surface 555 of the container cavity 505 and the bottom wall 556 of the container can be thickened vertically in order to locate the body at a more pleasing medial location within the container.

EXAMPLE

A outer substantially cubic hollow container made of transparent acrylonitrile butadiene styrene (ABS) having a wall thickness of about 5 millimeters and sides measuring about 15 centimeters square loosely carries a hollow spherical body of transparent ABS having a wall thickness of about 3 millimeters and a diameter of about 10 centimeters. The body is buoyantly supported inside the container by two immiscible, different density liquids. The first, higher density liquid is a mixture of about 81% by volume propylene glycol and 19% by volume water. The second, lower density liquid is dodecane. The body is formed by two hemispherical shells bonded along an equator by an amount of adhesive. An angular gap in the adhesive of about 10 degrees forms a conduit for the flow of liquid between the inside and outside of the body.

Testing showed that the device tolerated exposure to temperatures up to 50 degrees C., whereas devices without the gap burst at about 40 degrees C.

While the exemplary embodiments of the invention have been described, modifications can be made and other embodiments may be devised without departing from the spirit of the invention and the scope of the appended claims.

The invention claimed is:

1. A self-rotating device comprises:
   a light transmissive outer container having an internal cavity shaped and dimensioned to contain an amount of a fluid and a self-powered hollow rotating body immersed in said fluid;
   wherein said outer container is sealed;
   wherein said body comprises:
   an outer wall substantially impermeable to said fluid;
   a top shell and a bottom shell joined along a seam by a bond;
   an inner chamber;
   at least one conduit passing through said outer wall and defining a fluid passageway in fluid communication between said cavity and said inner chamber;
   wherein said conduit comprises a gap between said top shell and said bottom shell along said seam; and,
   a portion of said fluid located in said inner chamber, and an amount of a gas in said inner chamber.

2. The device of claim 1, wherein said amount of fluid comprises a lower density component fluid and a higher density component fluid, wherein said lower density component fluid is substantially immiscible with said higher density component fluid.

3. The device of claim 2, wherein each of said component fluids are denser than air.

4. The device of claim 1, wherein said amount of fluid comprises a first lower density liquid and a second higher density liquid, wherein said first liquid is substantially immiscible with said second liquid.

5. The device of claim 4, wherein said conduit has a first aperture through said outer surface of said body located above an interface between said first and second liquids, when said device is at equilibrium in a gravity field.

6. The device of claim 1, wherein said gap is formed by an absence of said bond.

7. The device of claim 1, wherein said body is substantially spherical and wherein said cooperative mating surfaces occur at an equator.

8. The device of claim 1, wherein said conduit remains permanently immersed in liquid.

9. The device of claim 1, wherein said body further comprises:
   an electric motor comprising:
      a compass magnetic for aligning to an ambient magnetic field;
      at least one field magnet apart from said compass magnet;
      a mechanical linkage fixing an orientation of said field magnet to an orientation of said compass magnet;
      at least one coil mechanically fixed to said body;
      wherein said at least one coil is located to interact with a magnetic field generated by said at least one field magnet; and,
   a current supply for supplying commutated current to said at least one coil.

* * * * *